United States Patent
Khalil et al.

(10) Patent No.: US 11,250,099 B2
(45) Date of Patent: *Feb. 15, 2022

(54) WEB-BASED SOCIAL CONTENT AGGREGATION AND DISCOVERY FACILITY

(71) Applicant: Wakelet Limited, Manchester (GB)

(72) Inventors: Jamil Khalil, Manchester (GB); Sivabalan Umapathy, Colomiers (FR); Richard P. Butterworth, Sale (GB); Yiannis Hadjigeorgiou, Chorley (GB); Daniel C. Sheppard, Stockport (GB); Marcin Jedyk, Stockport (GB); Ayub Malik, Manchester (GB)

(73) Assignee: Wakelet Limited, Manchester (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/247,169

(22) Filed: Jan. 14, 2019

(65) Prior Publication Data

US 2019/0236117 A1 Aug. 1, 2019

Related U.S. Application Data

(63) Continuation of application No. 13/708,091, filed on Dec. 7, 2012, now Pat. No. 10,223,336.

(Continued)

(51) Int. Cl.
*G06F 17/00* (2019.01)
*G06F 16/958* (2019.01)
(Continued)

(52) U.S. Cl.
CPC ........ *G06F 16/958* (2019.01); *G06F 16/9558* (2019.01); *G06F 16/9566* (2019.01); *G06F 40/12* (2020.01)

(58) Field of Classification Search
CPC .... G06F 40/12; G06F 16/958; G06F 16/9558; G06F 16/9566; G06F 40/14;
(Continued)

(56) References Cited

U.S. PATENT DOCUMENTS 7,082,426 B2 7/2006 Musgrove et al.
7,512,900 B2 3/2009 Lynch et al.
(Continued)

FOREIGN PATENT DOCUMENTS

| WO | 0123976 A2 | 4/2001 |
| WO | 2013084206 A1 | 6/2013 |
| WO | 2015177638 A1 | 11/2015 |

OTHER PUBLICATIONS

Lica, "Content Aggregation Changing Trends", Internet eWritings—Online Public Relations. URL: http://web.archive.org/web/20080906005618/http://www.ewriting.pamil-visions.com/2008/09/03/content-aggregation/ [retrieved on Sep. 6, 2008], Sep. 3, 2008, pp. 1-8.

(Continued)

*Primary Examiner* — Jason T Edwards
(74) *Attorney, Agent, or Firm* — GTC Law Group PC & Affiliates

(57) ABSTRACT

In accordance with an exemplary embodiment a web-based content aggregation and discovery facility includes a plurality of content aggregations managed by the content aggregation and discovery facility, where each of the plurality of content aggregations is generated by a user and includes a plurality of web-linked content elements selected by the user, each comprising a URL and an image selection, where the plurality of visual web-linked content of a web-based content aggregation is directed to a topical subject.

11 Claims, 20 Drawing Sheets

Related U.S. Application Data

(60) Provisional application No. 61/568,928, filed on Dec. 9, 2011.

(51) Int. Cl.
*G06F 40/12* (2020.01)
*G06F 16/955* (2019.01)

(58) Field of Classification Search
CPC .... G06F 16/9535; G06Q 10/00; G06Q 30/02; H04L 51/32; H04L 67/20; H04L 67/22; H04L 67/306; H04L 67/36
USPC ......................................................... 715/234
See application file for complete search history.

(56) References Cited

U.S. PATENT DOCUMENTS

| | | | |
|---|---|---|---|
| 7,698,303 | B2 | 4/2010 | Goodwin et al. |
| 8,082,486 | B1 | 12/2011 | Damman et al. |
| 8,316,001 | B1 | 11/2012 | Albrecht et al. |
| 8,438,124 | B2 | 5/2013 | Spivack et al. |
| 8,930,370 | B2 | 1/2015 | Musgrove et al. |
| 9,141,590 | B1 * | 9/2015 | Wheeler ............. G06F 16/9562 |
| 9,609,073 | B2 | 3/2017 | Yung et al. |
| 10,223,336 | B2 | 3/2019 | Khalil et al. |
| 2003/0005053 | A1 * | 1/2003 | Novaes ................. G06F 16/958 709/204 |
| 2003/0009536 | A1 | 1/2003 | Henderson et al. |
| 2003/0061209 | A1 | 3/2003 | Raboczi et al. |
| 2004/0143600 | A1 | 7/2004 | Musgrove et al. |
| 2005/0210102 | A1 * | 9/2005 | Johnson ................. H04L 67/22 709/204 |
| 2005/0261987 | A1 | 11/2005 | Bezos et al. |
| 2006/0036575 | A1 * | 2/2006 | Lau ....................... G06Q 10/10 |
| 2008/0077543 | A1 | 3/2008 | Kobayashi et al. |
| 2008/0082468 | A1 | 4/2008 | Long et al. |
| 2008/0086436 | A1 | 4/2008 | Zhao et al. |
| 2008/0091628 | A1 | 4/2008 | Srinivasa et al. |
| 2008/0162431 | A1 | 7/2008 | Xu et al. |
| 2008/0201634 | A1 | 8/2008 | Gibb et al. |
| 2008/0294621 | A1 | 11/2008 | Kanigsberg et al. |
| 2009/0030886 | A1 | 1/2009 | Pandeya |
| 2009/0055369 | A1 * | 2/2009 | Phillips ............... G06F 16/9535 |
| 2009/0064007 | A1 | 3/2009 | Lazier et al. |
| 2009/0171871 | A1 | 7/2009 | Zhang et al. |
| 2010/0205541 | A1 | 8/2010 | Rapaport et al. |
| 2011/0145064 | A1 | 6/2011 | Anderson et al. |
| 2011/0225140 | A1 | 9/2011 | Wu |
| 2011/0258560 | A1 | 10/2011 | Mercuri et al. |
| 2012/0047150 | A1 | 2/2012 | Spiegel |
| 2012/0066625 | A1 | 3/2012 | Encina et al. |
| 2012/0072382 | A1 | 3/2012 | Pearson et al. |
| 2012/0191719 | A1 | 7/2012 | Musgrove et al. |
| 2012/0233191 | A1 * | 9/2012 | Ramanujam ........ G06F 16/9535 707/758 |
| 2012/0284245 | A1 | 11/2012 | Portnoy et al. |
| 2013/0046770 | A1 | 2/2013 | Tseng |
| 2013/0110825 | A1 | 5/2013 | Henry |
| 2013/0151948 | A1 | 6/2013 | Khalil |
| 2013/0290430 | A1 | 10/2013 | Yung et al. |
| 2015/0254252 | A1 | 9/2015 | Khalil et al. |

OTHER PUBLICATIONS

PCT/IB2012/057081, "International Application Serial No. PCT/IB2012/057081, International Search Report and Written Opinion dated Mar. 19, 2013", 9 pages.

PCT/IB2015/001269, "International Application Serial No. PCT/IB2015/001269 International Search Report and Written Opinion dated Nov. 12, 2015", Wakelet Limited, 9.

Lica, "Content Aggregation Changing Trends", Online Public Relations, Sep. 3, 2008, pp. 1-8.

* cited by examiner

WEB-BASED SOCIAL CONTENT AGGREGATION AND DISCOVERY FACILITY

CROSS-REFERENCE TO RELATED APPLICATIONS

This patent application is a continuation of U.S. patent application Ser. No. 13/708,091, filed Dec. 7, 2012.

U.S. patent application Ser. No. 13/708,091 claims the benefit of the following provisional application, which is hereby incorporated by reference in its entirety: U.S. Patent Application Ser. No. 61/568,928, filed Dec. 9, 2011.

BACKGROUND

Field

This invention relates to web-based social content management, and more specifically to methods and systems for a user to organize and discover web-based content.

Description of Related Art

The Internet provides a seemingly limitless amount of content, and users of the Internet are constantly combing through this content in an effort to understand various topics, such as current events, medical issues, academic and professional research, evaluation of available products, searching for a service, reviewing a business activity, education, and the like. The Internet provides a great resource for access to this content. However, the user, after educating themselves on a topic through their Internet searching, is often left with no means for passing that knowledge experience to another individual. Therefore a need exists for improved methods and systems to allow the user to organize their research, study or activity on the web in a way that can be shared easily and understandably with another individual.

SUMMARY

In accordance with exemplary and non-limiting embodiments there is provided a web-based social content aggregation and discovery facility that allows a user to express web-based linked content into a contextual visual-linked presentation, referred to herein as a Wake, that may be stored and/or shared with others as an organized representation of the user's collective Internet search on a topic. Further, upon sharing their Wake, embodiments of the present invention enable the user to discover additional content related to their Wake and/or links associated with their Wake through the system by comparing and relating other user's related links and Wakes, thus enabling an Internet discovery and collaboration that extends beyond the user's direct contacts and out to the global Internet-connected user base.

In accordance with an exemplary embodiment a web-based content aggregation and discovery facility, comprises a plurality of content aggregations managed by the content aggregation and discovery facility, wherein each of the plurality of content aggregations is generated by a user and is comprised of a plurality of web-linked content elements selected by the user, where the plurality of visual web-linked content of a web-based content aggregation is directed to a topical subject and a plurality of user content databases, with at least one content database associated with each user for storing content information associated with the web-linked content elements of the content aggregations generated by each user, the content information comprising a URL and an image selection, wherein the image selection is an image selected from images provided at a URL linked web location. The web-based content aggregation and discovery facility further comprises a visual web-linked user interface, wherein each of the plurality of web-linked content elements for a given web-based content aggregation are presented visually utilizing the image selection, wherein the image selection is linked to a web location by the URL and a content aggregation grader for applying attributes to the plurality of content aggregations, wherein the attributes are comprised of at least one of an aggregation activity factor, an aggregation relation factor, and an aggregation interest factor. The web-based content aggregation and discovery facility further comprises a content aggregation finder for analyzing one or more constituents of the plurality of content aggregations and generating a content profile for visual web-linked content elements, the profile comprising the URL, a source of the URL, and a date of creation of the URL and a privacy filter for assigning a privacy setting to each of the plurality of content aggregations, wherein the privacy setting is at least one of public, private, and selected. The web-based content aggregation and discovery facility further comprises a user interest profile to store indicators of the user's interest based on the user adding a web-linked content element to a new or existing web-based content aggregation, a content aggregation link analyzer for determining a categorization and a relation strength for each of the web-linked content elements, wherein the relation strength is an indicator of a number of common web-linked content elements present amongst the plurality of content aggregations and a content aggregation feed engine to provide a discovery of new content to users as associated with each of the user's content aggregations when a new web-based content aggregation is created or a web-linked content element is added to an existing web-based content aggregation managed by the web-based content aggregation and discovery facility as a based on at least one of the attributes, content profile, user interest profile, categorization, and relation strength, wherein if a new web-linked content element is created, the web-linked content is stored in the user content database and sent to the content aggregation link analyzer for updating the user interest profile, and if a new web-based content aggregation is created, the web-based content aggregation is stored in the user content database and sent to the content aggregation grader for grading, sent to the content aggregation finder for analysis and to update relations, and sent to the content aggregation link analyzer for updating the user interest profile.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

Figure 1:
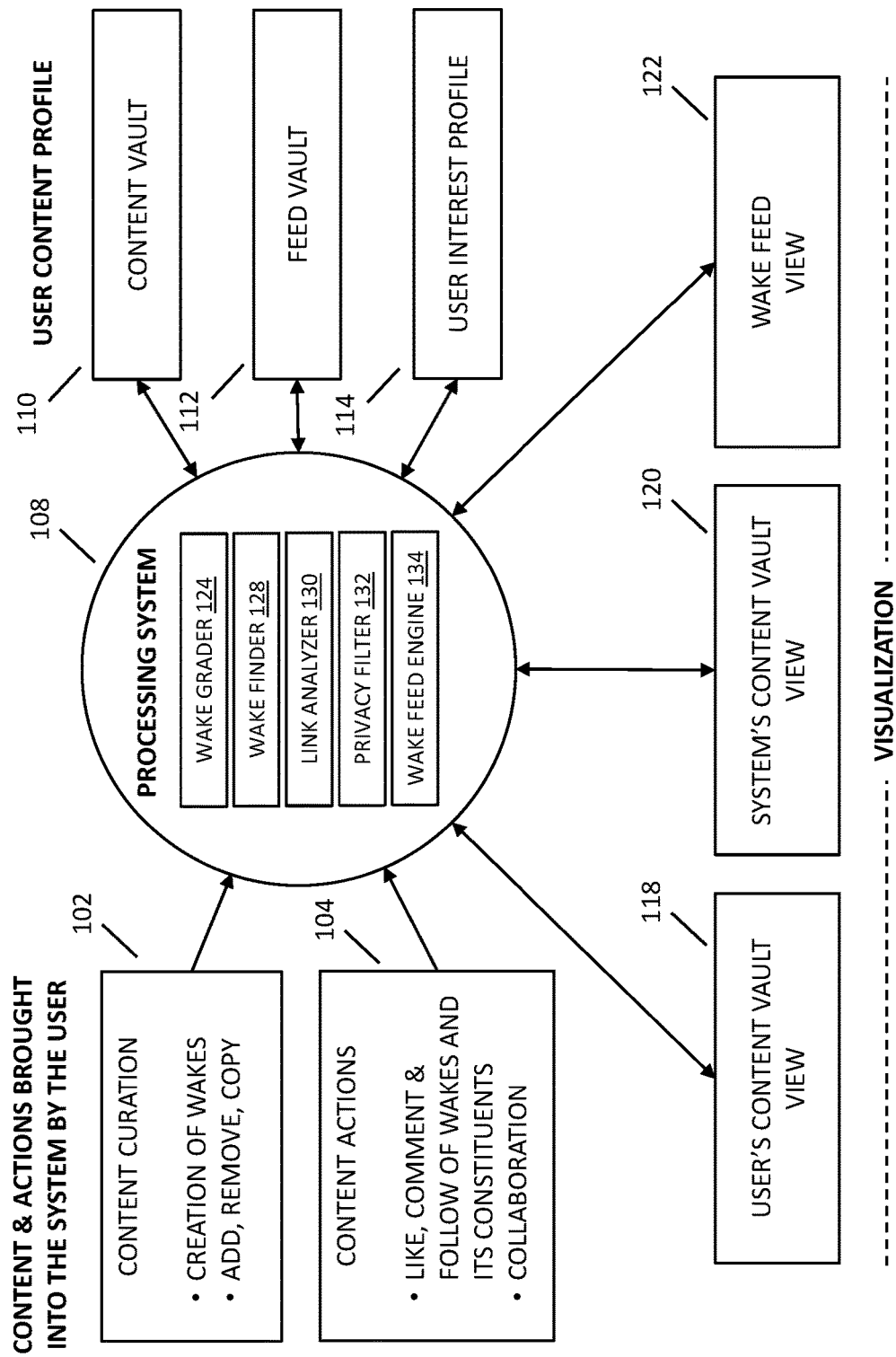
FIG. 1 is a block diagram of the system according to an exemplary and non-limiting embodiment.

While the invention has been described in connection with certain preferred embodiments, other embodiments would be understood by one of ordinary skill in the art and are encompassed herein. In the descriptions that follow, it is understood that all references to an "embodiment" or "embodiments" refer to an exemplary and non-limiting embodiment or embodiments, respectively.

DETAILED DESCRIPTION

In accordance with an exemplary and non-limiting embodiment, a content aggregation and discovery facility may be provided as a social content discovery platform that enables users to collaborate, aggregate, and curate large amounts of information in the form of a content strand-story with collective meaning and context. The content aggregation facility will also be referred to herein as 'the system', and the user product of the system a 'Wake', such as in the content aggregation and discovery facility enabling a user to document the Wake of their aggregated linked path through their on-line discovery of content and information. Where appropriate, the descriptor "content aggregation" may be used interchangeably with "Wake". In the midst of the on-going convergence of media and the hybridization of devices, the content aggregation and discovery facility offers users features to structure relevant web links, research specific content, and to access links and discover related content within a frame of an expert-level system/network. As used herein, all such links may be referred to as "web-linked content elements". In addition to web-linked content elements, Wakes may additionally comprise one or more user owned content elements including, but not limited to, documents, images, power point presentations and the like. The system extends beyond making friends, and its reach is far greater than that of a user's social circle. Embodiments of the system disclose curating content, referred to as Wakes, where Wake is a 'contextual collection of links'. Stories, research, and portfolios are some examples for manifestation of this context. Users may create, follow, discover, discuss, personalize, and share these Wakes. The system allows one to analyze these Wakes and their relationships to derive correlations between different Wakes, which in turn propels discovery of new content for a user. Wakes may be limited to use by the user, to a group, or shared with other people, such as publicly with no restrictions, or with a selected group (i.e. limited to friends, a listing, a region, a country, and the like). For instance, some Wakes may be interesting for like-minded people to like-minded people within the public space.

The system allows users to express information by linking content together and by creating relationships. The user's activity on Wakes establishes fundamental relationships. These relations render a context, which reflects the user's intent. Based, at least in part, on the unique relationships within and among Wakes, the system may provide a streamlined content discovery system through a 'Wake feed' and related pages, which allows the user to discover relevant content in relation to what the user is interested in, where a Wake-feed is a tool that the system may provide so that the users can actively discovery content. The Wake-feed may also notify the user about the activity/actions around this content (e.g. added links, relevant links through discovery, 'likes', other user comments, and the like.)

In accordance with exemplary and non-limiting embodiments, a Wake contains a collection of human submitted and orchestrated links that may be aimed at a single interest, intention or topic, such as for example, to highlight a political issue or something of interest. This set of links is the informational structure of what the Wake creator is intending to convey to their viewer/follower. Wakes that share common links may have a related informational structure and hence may share the same ideas and sentiment. As a result, any links that are different between these Wakes may also be relevant to the creator of the other Wake. Creating Wakes extends beyond collecting links, information, content, and the like. Creating Wakes may be viewed as akin to telling stories, and being able to pass those stories on. Stories provide identification, a frame of reference and the opportunity to relate to a narrative. Being able to tell compelling visual-linked stories in a meaningful way is an impactful component of the content aggregation and discovery facility.

In accordance with exemplary and non-limiting embodiments, the system may allow for users to create Wakes as a unique expression of their individual style, such as involving the careful, thoughtful, structural, emotional and visual orchestration of content to form the Wake-story thereby delivering a message in a way that is meaningful to the user and/or other people. The aggregation of this content and the relationship between its handpicked and carefully organized links and informational structure creates the context of a Wake. For example, a freelance journalist may create a Wake for organizing content and links from his blog to publish his views on the evolution and future of leading world events; a partner at a private equity firm may create a Wake where she uses the system to keep her clients and team updated with the latest content on potential investment opportunities; a sports fan and sports teacher may create a Wake to organize a specific message on a successful football player with the intention to share this Wake with his students to help motivate and inspire them; a researcher may create a Wake by using the system to gather content for her assignments and research, where she initially keeps her Wakes private so that they are only visible to her and on completion makes some of her private Wakes public so other people can share her findings; a freelance photographer may create a Wake for collecting and sharing her content about her cameras, including product commercials, specifications, comparisons, reviews, guides, pricing, paging, and the like from her blog containing photographs taken using her cameras, and the like. In embodiments, a private Wake may be shared with others, where sharing may be through secure methods and systems known to one skilled in the art. For instance, a lawyer may create a private Wake and share it with another lawyer within the law firm, where the Wake is encrypted to protect against theft or inadvertent sharing of the Wake with an unauthorized person. In embodiments, a group of individuals working collectively on a Wake may be provided a secure Wake collaboration environment.

FIG. 1 presents an embodiment component overview of the system, including content curation 102 and content actions 104 as content and actions brought into the system by the user; a processing system 108, comprising a Wake grader 124, a Wake finder 128, a link analyzer 130, a privacy filter 132, and a Wake feed engine 134; a content vault 110, feed vault 112, user interest profile 114 as part of the user content profile; a user content vault view 118, system's content vault view 120, and Wake feed view 122 as part of the visualization of the system. The system enables management of user-generated content and actions in the creation and curation of Wakes, where a basic component of a Wake is one or more links that the user adds. The links can be added at any point of time into the Wake, and the user has complete control over the Wakes. The system provides a mechanism to store, retrieve, and visualize user-generated content. The intelligence of the system uses an algorithm to find relations between Wakes generated by distinct users. And the system in turn provides a user with content they might be interested in, such as by using the Wakes they generated as a reference.

The system has functions that allow users to create and maintain the contents, such as Wakes and individual links. Users can also continue to interact with the content. The interaction can be various forms such as consuming content, following content, collaborating on content, and the like. The system is comprised of distinct processing units that act upon the content and the user action on the content. These processing units help to unearth relevant content that would be of interest to individual users. All the content, users actions, and users interest are captured and persisted. The profile also consists of digested information that demonstrates the user's interest. The system also contains various interfaces through which users can access their own content and other relevant content.

The system provides content curation 102 to users enabling them to create, add, remove, and copy Wakes in a sophisticated and contextual way. A user may create a Wake, by providing a name and description. While creating a Wake, the user may specify the visibility level of the Wakes. Wakes may be private, public, or accessible to a selected audience. A Wake at the time of creation should consist of at least one link, and the Wake belongs to the user. A user alone may be able to add links to the Wake. If a Wake is private, the owner may alone get to modify the Wake and see the Wake. In case of a public Wake, the owner alone may be able to make modifications, while anyone may be able to see the Wake and its contents. If the Wake has a selected view, then the users selected by the owner alone may have permission to see the Wake. Further, the owner may specify if the selected owners can modify the Wake or not. The user may be allowed to add links to existing Wakes at any time. While adding a link to the Wake, the user may specify the category of the link that is being added. Users may have multiple ways to bring a link to the Wake. They can add a URL to the Wake. They can also add an existing page in the system to the Wake. The user can also remove a link from the Wake. If the last remaining link of the Wake is removed, the Wake ceases to exist in the system. A user may copy a Wake of another user. A copy allows users to create his own Wake and brings in all the links of source Wake to his Wake. After copying, the user is free to modify (add or remove) links from this Wake.

The system accepts content actions 104, such as a user specifying they like a Wake, commenting on Wake, following a Wake, collaborating in a Wake, and the like. A user may 'Like' a content existing within the system. A content in context of 'Like' is either a 'Wake' or 'Link' (a.k.a. 'Shared Link'). Once an action of 'Like' is executed, the user interface (UI) may not allow the action to be repeated. As a result of 'Like' action a total count of 'Likes' of the content may be incremented by one, cumulative 'Likes' count of the (content) owner may be incremented by one, and the like, where a content owner is a user who curated specified content. A user can 'Comment' a content existing within the system. The content in a context of 'Comment' is either a 'Wake' or 'Link'. Each User can 'Comment' content available. Every time an action of 'Comment' is executed, the UI may display the most recent comment. As a result of 'Comment' action a total count of 'Comments' of the content may be incremented by one (e.g. for each comment), a cumulative 'Comments' count of the content owner may be incremented by one, and the like. A user can 'Follow' a content existing within the system. The content in a context of 'Follow' is 'Wake'. Each User may 'Follow' content available. Every time an action of 'Follow' is executed, the UI may restrict User from following content again—instead the user may be permitted to execute a reverse action, such as 'Unfollow'. As a result of a 'Follow' action a total count of 'Followers' of the content may be incremented by one (e.g. for each follower), a cumulative 'Followers' count of the content owner may be incremented by one, and the like.

Within context of the system, users may 'Collaborate' on content curation. Collaboration is executed within context of a group, which constitutes one or more users. A User who creates a group may 'invite' other connected users to the Group and participate in 'Collaboration'—they become 'group members'. All content curated within a group is visible to the 'group members' and can be modified by them. Reverse action may also be possible, such as through 'Remove User from a Group' which will revoke 'Group membership' from a specified user. Within the context of a group of users they can have a discussion on the group that may work in a same way as 'Commenting', where the difference is that 'Discussion' is on a group rather than on a Wake or Link. Within a group of users they may still be allowed to execute 'Like', 'Comment' and 'Follow' in a same way, provided they are not restricted.

The processing system 108 has a number of processing components, including a Wake grader 124, a Wake finder 128, a link analyzer 130, a privacy filter 132, a Wake feed engine 132, and the like. As described more fully below, processing components are logical units of processing that may be implemented in software or hardware to achieve the results described. The Wake grader 124 has a number of attributes associated with it, including Wake constituents, Wake activity factor, Wake relation factor, Wake interest factor, and the like. Wake constituents indicate the individual links that the Wake is composed of. It consists of two aspects, namely, a current state and a chronological record of changes. Current state of a Wake indicates the active links that the Wake is composed of at the given point of time. If the Wake has undergone changes such as removal and addition, the chronological change of the Wake is also maintained. Wake grader is responsible of recording the changes in the Wake. Wake grader is also used to calculate the Wake activity factor. The Wake activity factor is a quantified value derived from the changes that have happened on the Wake and the time of the changes. Wakes are related to each other based on certain conditions, such as described herein as associated with the Wake finder 128. Wake grader 124 may assign a relation factor based on the depth and time of the relation. Based on the user's action and the interest on a Wake and its constituents, a quantified value may be assigned to the Wake that demonstrates the particular Wakes interest.

Figure 2:
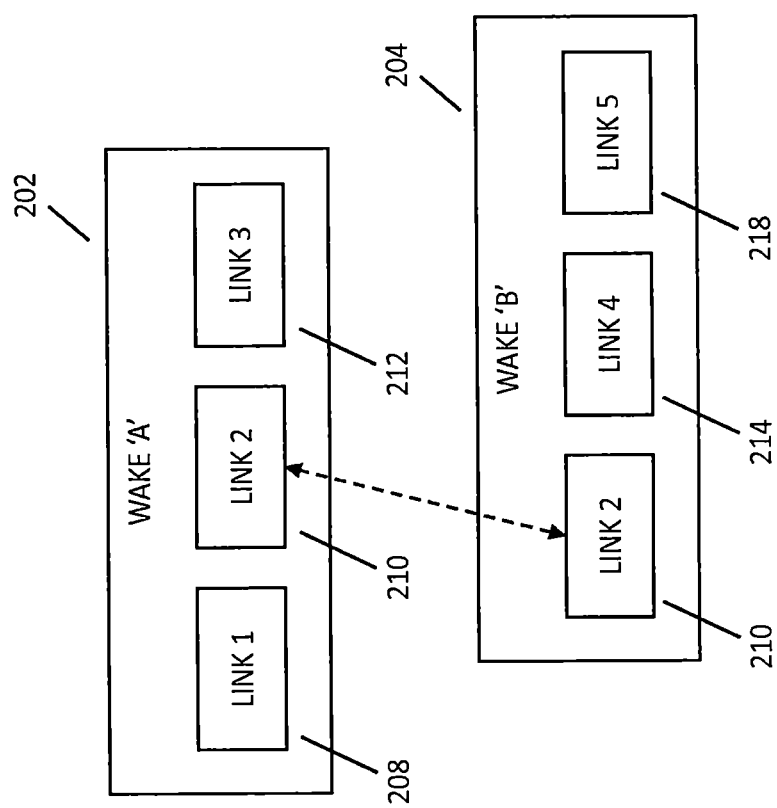
FIG. 2 is a diagram of common links amongst Wakes according to an exemplary and non-limiting embodiment.
Figure 3:
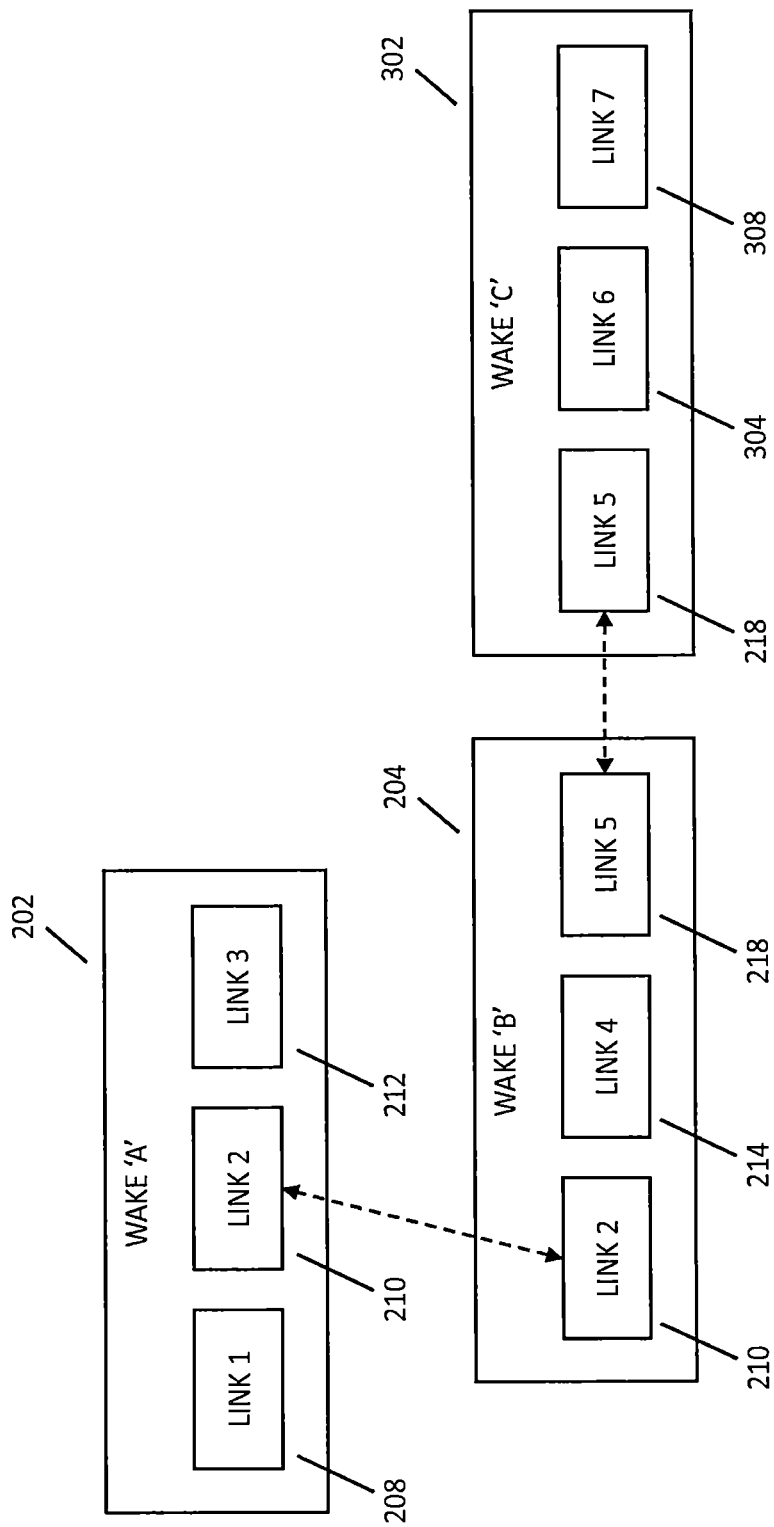
FIG. 3 is a diagram of common links amongst Wakes according to an exemplary and non-limiting embodiment.

The Wake finder 128 analyzes Wakes and its constituents. It analyzes each constituent on its own merit. The outcome of the analysis is a profile of the link. The profile contains information such as what the links is, which site the link is from, when the link was created, and the like. Using this profile it tries to find other Wakes that are related to the Wake it started analyzing. The basic profile of a link is its URL. So if the link itself is present in another Wake, it will be classified as a related Wake. FIG. 2 depicts two Wakes where the there is a common link, where Wake 'A' 202 has link 1 208, link 2 210, and link 3 212, and Wake 'B' 204 also has link 2 210, link 4 214, and link 5 218. Since there is at least one link 210 that is common between two Wakes, the Wakes are related. And, hence, the person who created Wake 'A', might be interested in the other links 214 and 218 present in Wake 'B'. There could be one or more links common between Wakes. This makes both the Wakes related. And this relation inherently indicates the links might also be relevant. When two Wakes share one more common links, they may be said to be in a direction relation. In FIG. 3, Wake 'A' and Wake 'B' share a common link. Wake 'B' and Wake 'C' share a different common link. This places Wake 'A' in an indirect relation with Wake 'C'. The distance of relation (direct, indirect at first level and the like) is quantified as the relationship factor of the two Wakes. It may be expressed in a number, such as 1, 2, 3 and so on, indicating the depth of the relation. Wake finder may also quantify the relation between the links using various attributes of the Wakes. The number of common links may be used to quantify the relation between links. The activity factor of the Wakes may also be used to define the relation between links.

The privacy filter 132 relates to the level of privacy that the user may specify for a Wake. Wakes may be defined with access levels. The access levels may be either public, meaning visible to any user in the system. Private, meaning visible only to content generator. Selected, meaning the content generator can designate a select list of his related persons on the Wakelet system. In a selected case it will be visible to all selected members. A Wake's visibility and access may be determined solely by the privacy level of the Wake alone. The privacy levels of individual links may be determined by the associated Wake's privacy level. If a link is present in multiple Wakes, where each Wake has different privacy levels, then the link's privacy level may be determined based on an order, such as public taking the first precedence, followed by selected, and then the private.

The link analyzer 130 profiles the links in the Wake for various purposes. The result of the link analyzer 130 will be different based on the profile run. For instance, the system may offers various profiles, such as a Wake categorization, a Wake relation strength, and the like. In a Wake categorization profile, the link analyzer 130 may check the categories of individual links in the Wake, and automatically categorize the Wake. If the links belong to multiple categories, the link analyzer assigns the Wake to all categories. Also it may use a weighted factor to decide which categories are important. The Wakes category may also be more deterministically narrowed based on the plurality of the categories found among its links, which may be further enhanced by analyzing the relevant links found in other Wakes. In a Wake relation strength profile, when two Wakes in direct relation are found, the link analyzer 130 profiles the number of common links to determine the strength of the Wakes. The number of common links between the links may be a factor used to determine the strength. The ratio of common links to non-common links may be another factor used to determine the strength.

The Wake feed engine 134 reacts to actions happening on content. It transforms actions to interest events and subsequently finds people who are eligible to receive these interest events. The Wake feed engine 134 promotes discovery of new content and relationships between Wakes. It may also inform the user of new Wake actions on Wakes that belong to them. When a user adds a link to an existing Wake that they have created, the Wake feed engine 134 discovers all the other users that follow that particular Wake and notifies them of the new link. If anyone follows a Wake, the owner of the Wake gets notified of the user who is following. A user can copy an existing Wake. In this case the owner of the original Wake will be notified that another user has copied their Wake. If a there is a like or comment on a constituent of the Wake (i.e. a link inside the Wake), all the related users (including the owners and followers) get notified of the relevant action. The action notification may be delivered with an applicable payload (such as the specific comment). When the Wake feed engine 134 needs to notify users of events that have occurred it will calculate who needs to be notified and update the Wake feed of the respective users. If the user is not active, i.e. not logged in, the notification may appear in the user's Wake feed when they subsequently login. However if the user is currently logged into the system they may be notified instantly. If a user has been invited to collaborate on a Wake, then the Wake feed engine 134 may deliver a collaboration notice. The payload of the collaboration notice may carry the inviting user and the relevant Wake.

Figure 4:
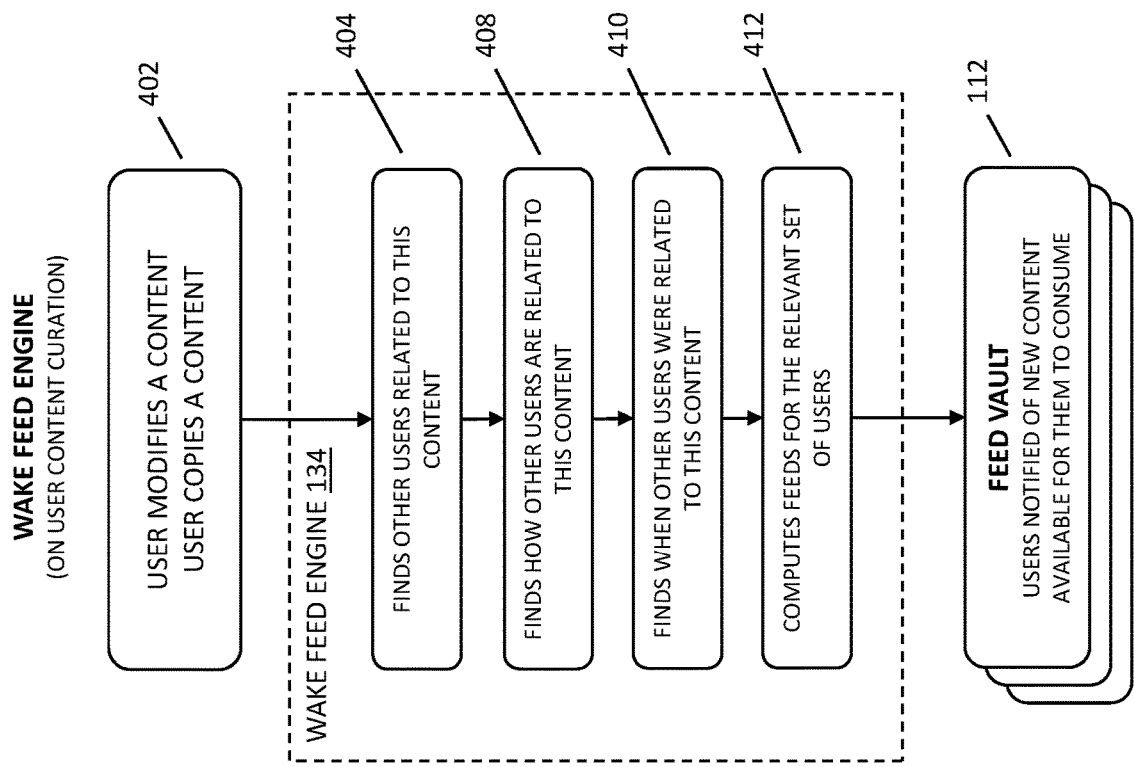
FIG. 4 is a flow chart of a method according to an exemplary and non-limiting embodiment.

FIG. 4 depicts a Wake feed engine process directed to user content curation, where a user modifies or copies content 402. The Wake feed engine 134 finds other users related to this content 404, finds how other users are related to this content 408, finds with other users were related to this content 410, computes feeds for the relevant set of users 412, and sends the new content to the feed vault 112 where users are notified of the new content available for them to consume.

Figure 5:
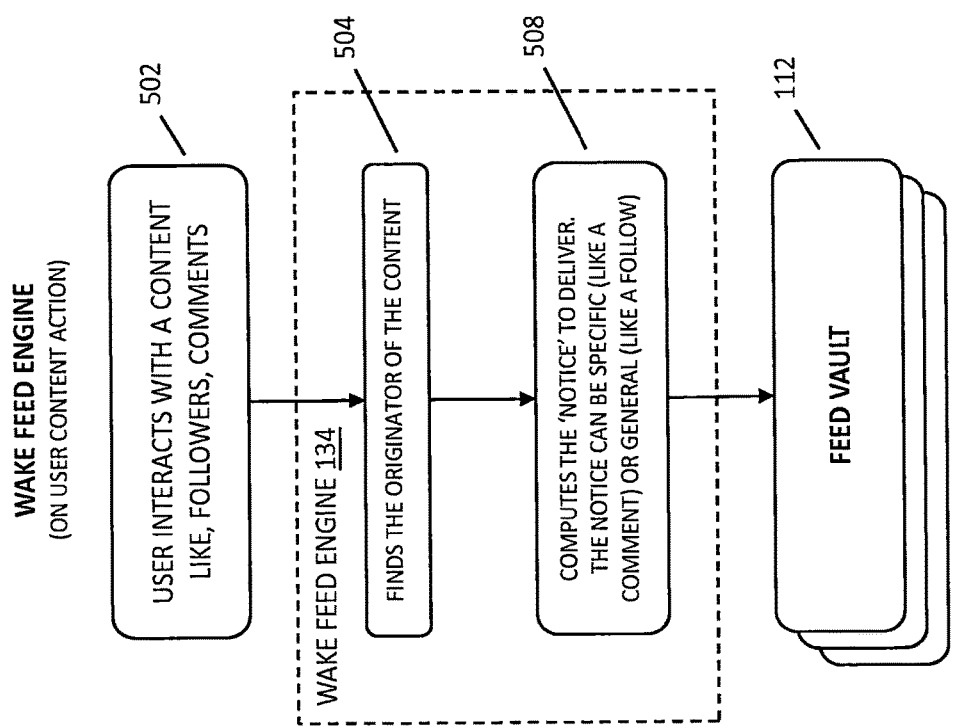
FIG. 5 is a flow chart of a method according to an exemplary and non-limiting embodiment.

FIG. 5 depicts a Wake feed engine process directed to a user content action, where a user interacts with a content, such as a 'Like', as a 'Follower', with a 'Comment' 502, and the like. The Wake feed engine 134 may find the originator of the content 504, compute the 'notice' to the deliver, where the notice can be specific (e.g. a comment) or general (e.g. a follow) 508, and stored into the feed vault 112.

The content vault 110 is a profile created in the system to reference all the contents the user has interest in. The content vault 110 may consist of all the Wakes and links. The relation to the content will also be retained. The relation could be either owner, follower, or interested in (by liking or commenting on Wakes or its constituents). The user may also be provided a user interface to visualize this content 118. The feed vault 112, is an active archive consisting of all the feeds generated by the Wake feed engine for the specific user.

When a user performs actions on the system (all actions including content curation and content action), the system may assume that there is a hidden interest by the user. Over a period of time the system may build a quantified user interest profile 114 of the user. This quantified user interest profile 114 may be a collective inference made based on the type of content he demonstrated his interest in and the period. Some of the information that may be captured in the system as part of the user interest profile 114 may include the number of Wakes created by the user, by its category; if a user has created larger number of Wakes in a particular topic recently (e.g. sports) then that topic is added to his interest profile. The System may track the amount of activity around types of content (e.g. videos, pages, and the like). If the user has greater activity on videos, their interest profile will have videos added to it, and the like.

Figure 6:
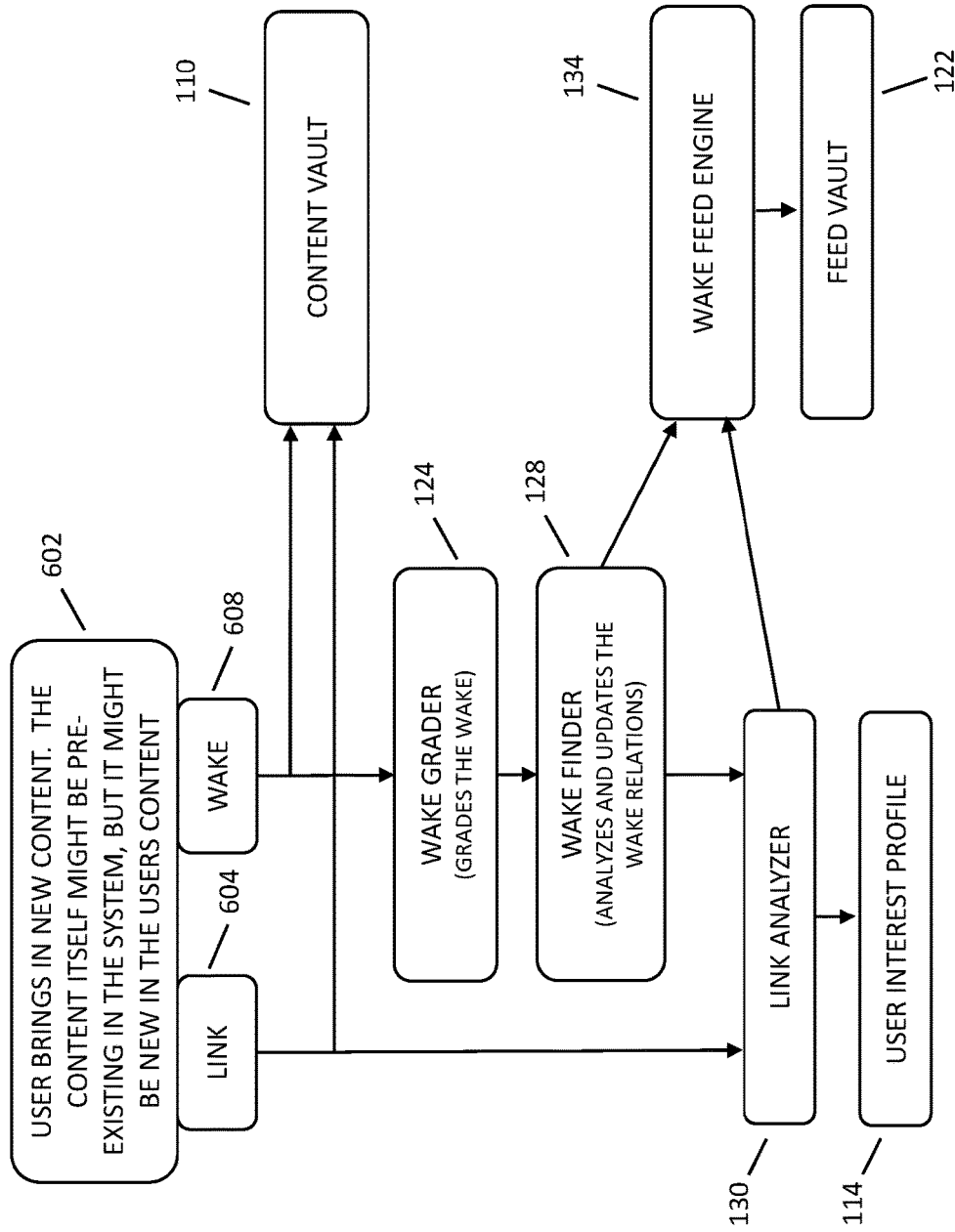
FIG. 6 is a flow chart of a method according to an exemplary and non-limiting embodiment.

A user may submit a new link to the system or add a link that already exists in the system to their Wakes. This demonstrates an interest from the user. FIG. 6 depicts a system flow diagram of how the system reacts to this action and executes different steps that ultimately facilitates content discovery for users in the system. The process flow begins 602 with the user bringing in new content, where the content may be pre-existing in the system, new content brought in by the user, and the like. In the instance that the new content is a link 604, the link 604 is stored in the content vault 110, and sent to the link analyzer 130. The link analyzer 130 updates the user interest profile 114 to demonstrate their interest based on the incoming links relations in the system. Wake feed engine 134 reacts to the new action that will initiate a content discovery action and feed vault 122. In the instance where the new content is a Wake 608, the Wake 608 is stored in the content vault 110, and sent to the Wake grader 124 where the Wake is graded. From here the Wake is sent to the Wake finder 128 for analysis and to update the Wake relations. The process for the Wake then follows a similar route to that of the link 604, where the Wake 608 is sent to the link analyzer 130 and on to the user interest profile 114, and also triggering the Wake feed engine 134 and feed vault 122.

Figure 7:
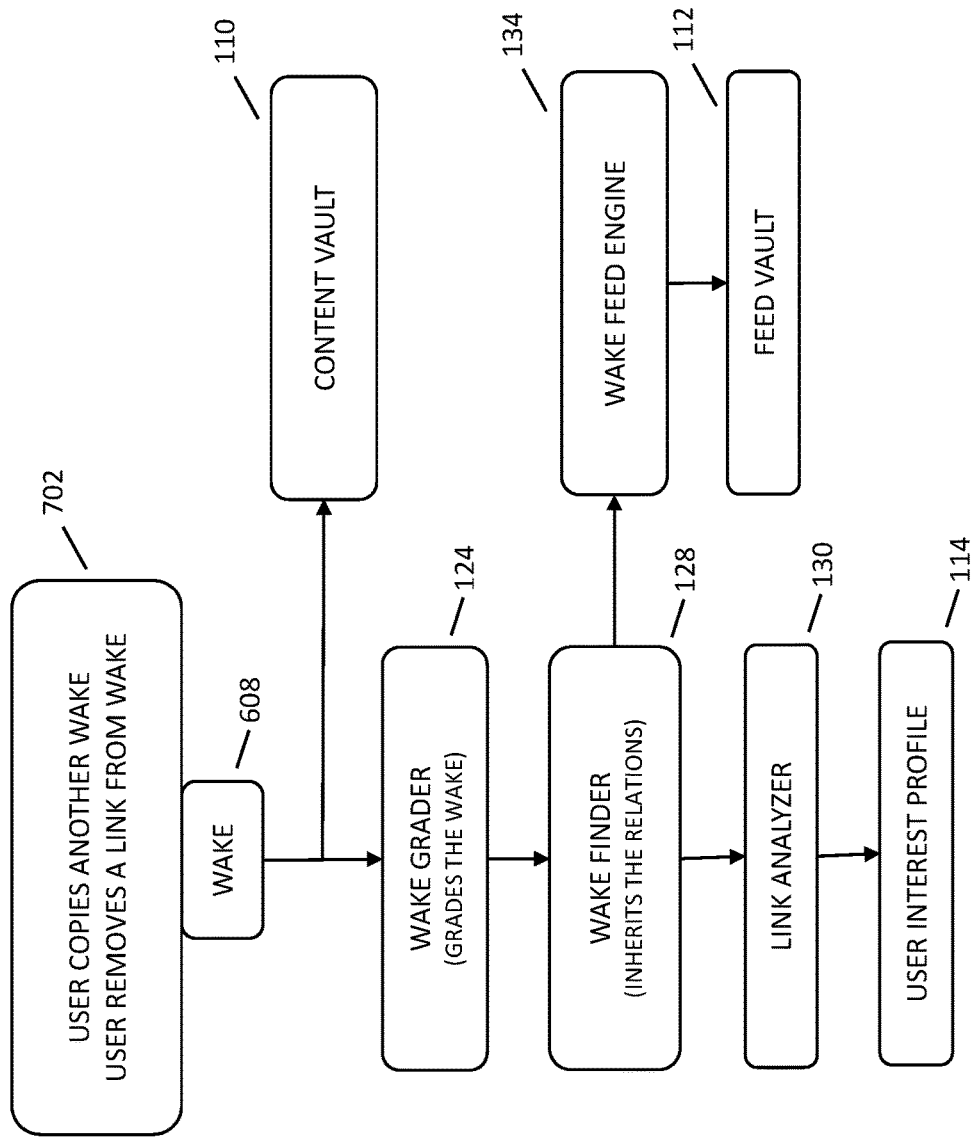
FIG. 7 is a flow chart of a method according to an exemplary and non-limiting embodiment.

A user may be able to create a copy of a public Wake for their own orchestration needs. When this happens it demonstrates that the user has a common interest to the specific Wake and/or Wake creator. FIG. 7 depicts a system flow diagram of how the system reacts to this action and executes different steps that ultimately facilitates content discovery for the users in the system. The process flow begins 702 with the user copying a Wake or removing a link from a Wake. The Wake 608 is then sent to the content vault 110 and also sent to the Wake grader 124 and on to the Wake Finder 128. From here the Wake is sent to the link analyzer 130 and resulting in an update to the interest profile 114. This action triggers the Wake feed engine 134 and feed vault 112.

Figure 8:
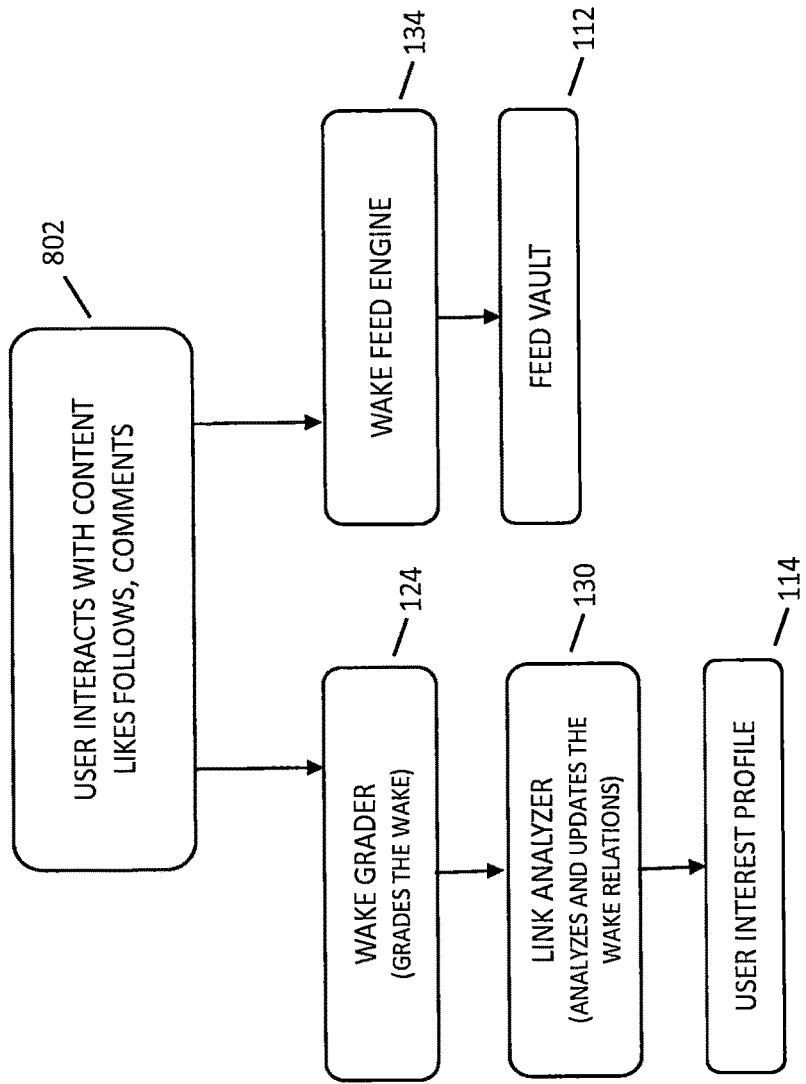
FIG. 8 is a flow chart of a method according to an exemplary and non-limiting embodiment.

A user may be able to interact (including but not limited to 'Likes', 'Follows', 'Comments') with the links and the Wakes in the system, and the like. FIG. 8 depicts a system flow diagram of how the system reacts to this action and executes different steps that ultimately facilitates to content discovery for users in the system. The process flow begins 802 with a user interaction with content, where the interaction is then flowed into the Wake grader 124, link analyzer 130, and resulting in the user interest profile update 114, and triggering the Wake feed engine 134 and feed vault 112. In embodiments, a user may interact with the creation of a Wake by creating a new Wake, such as to contest the Wake, to reply to the Wake, and the like. For example, a Wake may be created that attempt to make an argument for something, such as support for a political candidate, and a second user responds with a new Wake to counter the arguments made in the original Wake. The new Wake may utilize the original Wake, such as in making a copy of the Wake to start the new Wake, or the Wake can begin as completely new.

Use-Case Description

Figure 9:
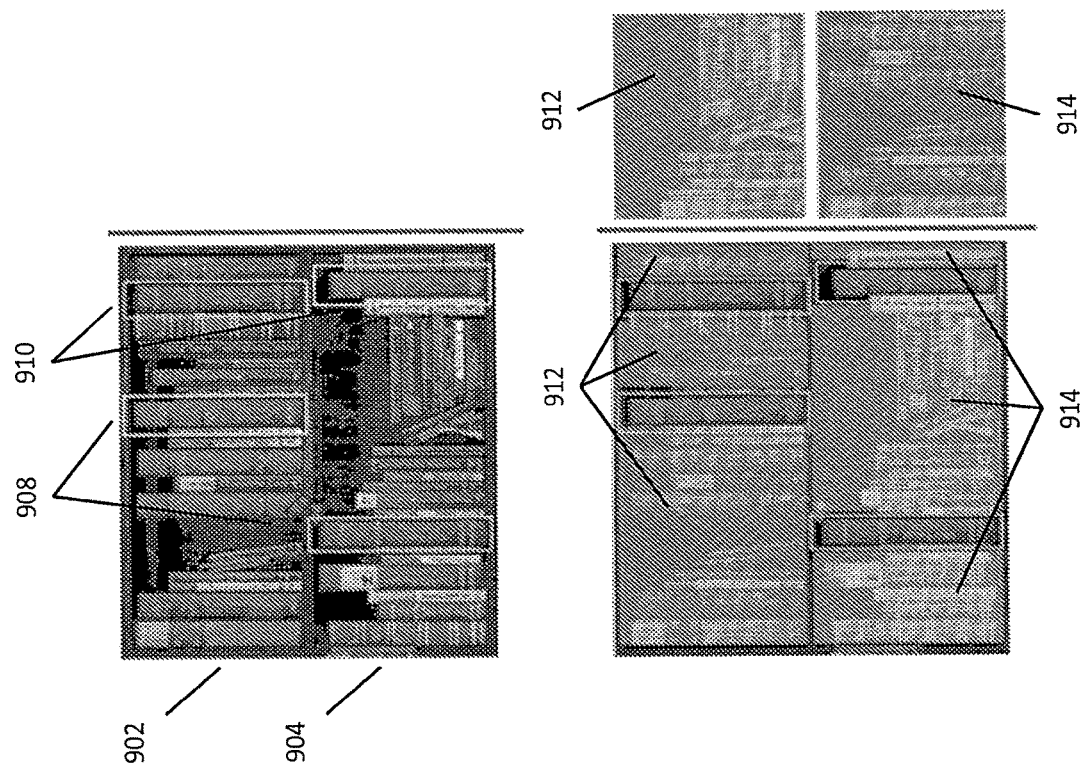
FIG. 9 is an illustration of content discovery concepts according to an exemplary and non-limiting embodiment.

The described content discovery platform encourages common interests. In an example, FIG. 9 relates the concept of discovery through a relevance comparison of two user's content databases with that of two users comparing books owned in their book collections. In this instance, a bookcase shows the book collection from user one on bookshelf 902 and the book collection from user two on bookshelf 904. As shown, the users have some books in common 908 and 910, which may provide evidence that the two users share common interests, and as such, user one may be interested in 'un-common' books 914 from user two, and user two may be interested in un-common books 912 from user one.

In a use-case example, common interest may be used to discover related content in a research context (such as projects, studies etc). For instance, User J is a research student in neurology. User J curates a Wake consisting of large set of links related to his doctoral thesis. User S is a research assistant in another university working on the same research area. User S starts creating a Wake. Due to their quite narrow field of specialization, User S adds a link to his Wake, which is also present in User J's Wake. In this instance, the system will present all of User J's Wake to User S on his feed. User S gets access to information which is very relevant to him. Most of the information in User J will also be relevant to User S.

In another user-case example, common interest may be used to discover related content in a commercial context. For instance User K is a skiing enthusiast. He plans to enjoy a ski holiday at a new resort in southern France which he has not visited. User K creates a Wake to collect all his links for his ski trip. While adding some links, User K finds some relevant links from User T Wake, who incidentally had been to the same ski resort. User K finds links on places to eat, plan of ski track, ski rental place, hotels to stay. User T has different plans for lodging (say at a nearby town). So the links he found on lodging may be not relevant, however links he discovered on ski rental is useful to him.

The preceding two examples illustrate how one user's Wake is of interest to another, but in different respects. The producing user had a specific intention in creating each of the Wakes. The consuming user of the Wake might be interested in all or some of the links. The consuming user's action (such as copying links to his own Wake or liking a link or following a Wake), will provide a basis to understand different structures of a Wake and its related context. Similarly the metadata of each links will help to classify the structure more clearly. The system uses this information to analyze and categorize Wakes.

In another use-case example, the system may recommend Wakes, such as when the user was viewing a link from the public links page. For instance, user L goes to the landing page, where the landing page lists all the individual links in the system. User L is interested in one of the links. User L clicks to the link to explore more. The system finds all the Wakes the link is present in, and provides these Wakes to the User L. The system may also perform filtering on the all the Wakes, to select a subset of a Wake for providing it to User L. This filtering may happen based on different factors such the structure of the Wakes, user interest profile and the like.

Figure 10:
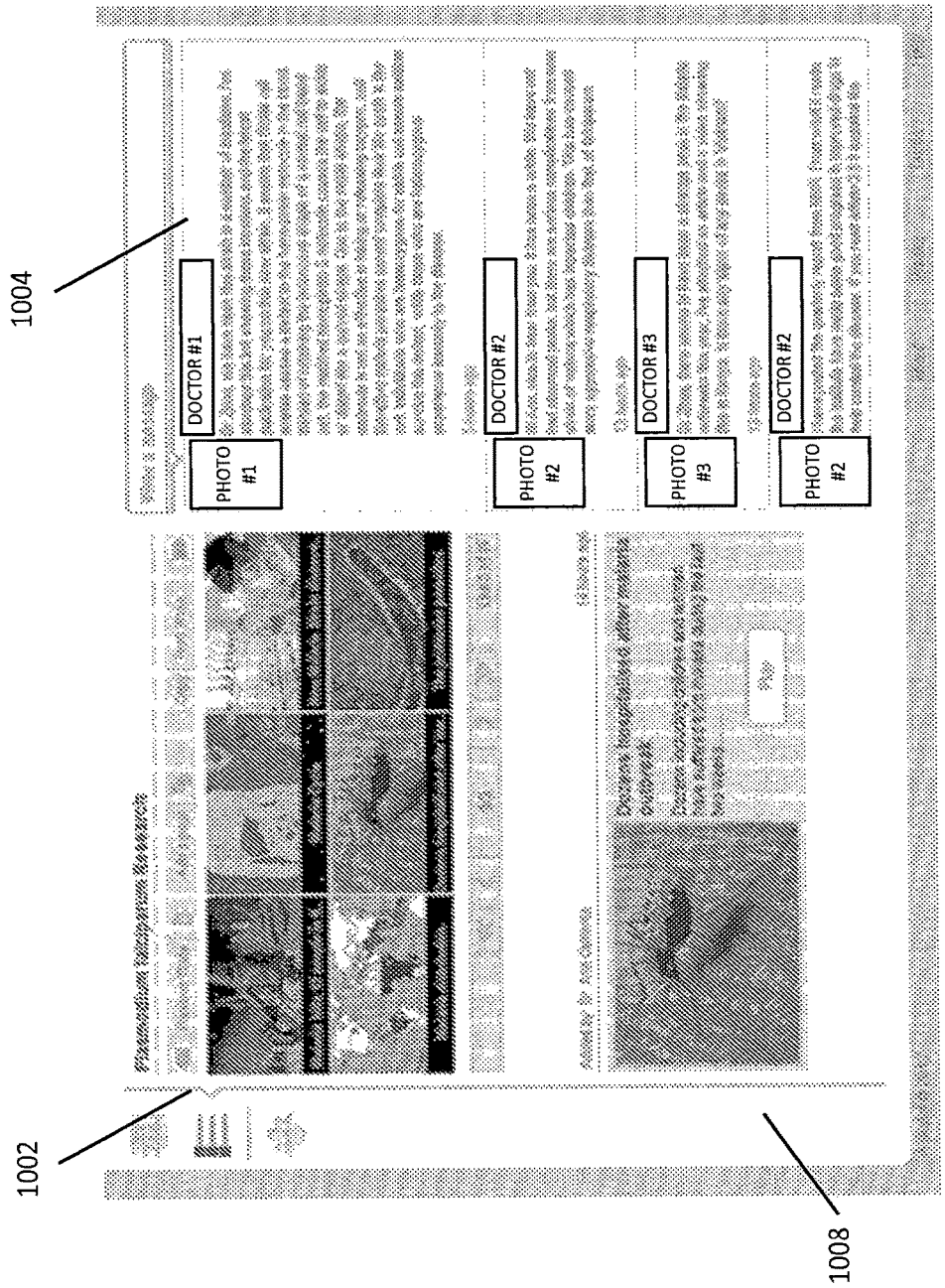
FIG. 10 is an illustration of a Wake according to an exemplary and non-limiting embodiment.
Figure 11:
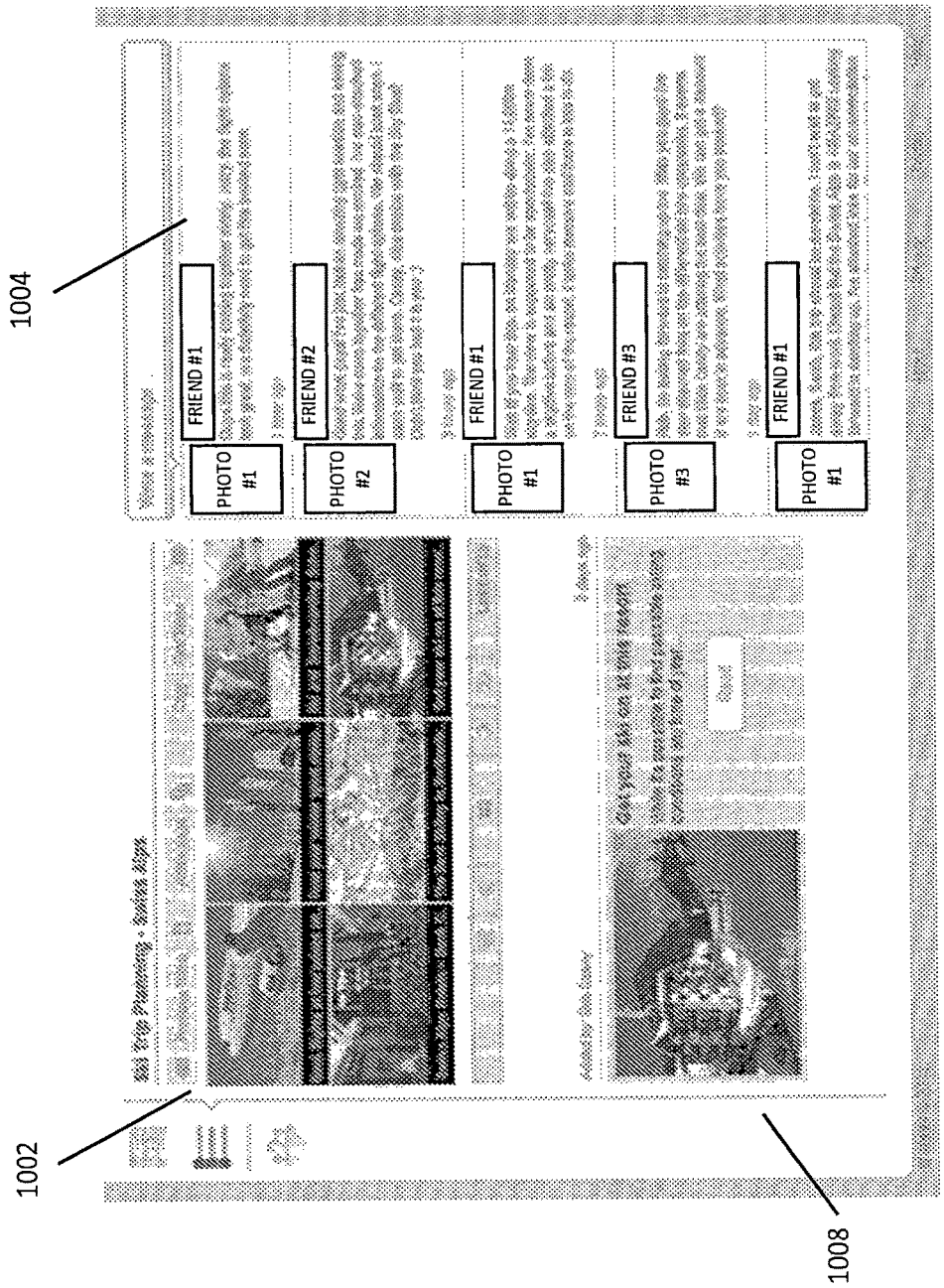
FIG. 11 is an illustration of a Wake according to an exemplary and non-limiting embodiment.

In an embodiment example of the system, a Wake may be used to facilitate collaboration amongst a private group of disease control specialists, field scientists, epidemiologists, and the like, created by a group administer in the area of healthcare and charity. The collaborative Wake may address outbreaks, where scientists working on an outbreak of a communicable disease could each have responsibility for uploading content, pages, links, and the like, and system could create a live 'picture' of disease status, such as including a link to a geographical information system (GIS). The Wake can act as a journal article and evidence repository. This Wake may be a group-Wake, with permissions for group members, where members add content; new content is notified to the other members through the Wake discovery system, and the like. FIG. 10 depicts a group Wake for this collaborative example, showing a Wake view area 1002, a dialog area 1004, and a discovery area 1008 as might be viewed on a user interface. In another example, FIG. 11 depicts a group Wake for a group of friends booking a ski trip. Other examples may be a group school assignment, a joint professional project, a group of parents investigating a potential local health hazard, and the like.

In embodiments, the content aggregation and discovery facility may be used by commercial entities, such as in the form of a Wake-store facility. A user may visit the Wake-store facility, which may contain a library of external stores and their associated Wakes. Libraries may include stores for numerous verticals, such as retail, wholesale, consumer goods, healthcare, services, and the like. Each store may be visually represented by its own Wake search engine system. Each store may have its own Wakes relative to what products they are offering. The Wake search engine user interface may be visually configured to personalize the store and may allow a selection of widgets. The Wakes in the store system may be specific to a single product e.g. Rebok 'Crossfit' running shoes or to a group of a products e.g. Reebok Running Shoes. If the user likes a product, the user may be able to follow the specific product Wake. If the user follows a Wake from a specific store, the Wake may be displayed in the users store Wake search engine system. Following a Wake may create a relationship between the user, Wake, product, store, friends, connections, and the like. The users Wake search engine system may contain multiple Wakes from the same store or may be made up from Wakes from multiple stores. The Wakes in the users Wake search engine system may be categorized and organized. This may allow the user to personally curate his or her own store made up of components of multiple stores. The users store may only be made up of products that he or she is interested in. If the store has new information around a specific product, the store may update the product Wake. Updates may include new or removal of content articles, videos, blogs, comments, and the like. Based on the update, the user may be automatically notified through the users Wake discovery system (such as through the Wake-feed and related pages).

In embodiments, the user may not be following a brand/store, but rather a specific product Wake within the store. This may allow the store to better know the specific user interest. Since the user is following a product Wake(s) from a specific store, the user has created a relationship/interest between the user, Wake, product, store, friends, and the like, or connections using the store or following the product or similar products. The store may now be able to tailor its marketing more accurately based on the personally requested/interested needs of the user. Because the user only enters the store at will, it may also mean that the user is highly interested in browsing or potentially buying. This potentially leads to a higher conversion, where if you compare this to the physical world, a user who willingly visits a store has a much greater chance of making a purchase, and so the rate of acquiring a product may be very high. The store could also display special offers and recommend products and the like on its Wake search engine system user interface. A store loyalty system could be provided. Analytics may be provided based on user, product, friends, connections, and the like. Because of the way this system operates (the user entering at will and only selecting items of interest), it may be significantly less intrusive than the conventional types of unsolicited advertising. Moving away from conventional advertising to a store also ensures that the system usability and user experience is not impacted due to advertising. The user's personal store may be public or private and information/product recommendations may be easily established between people and products and reported through the discovery system.

Referring again to FIG. 1, the system may provide various visualizations/views, such as through the user's content vault view 118, the system's content vault view 120, and the Wake feed view 122. FIGS. 12-15 depict embodiment views of the user's content vault view 118, FIGS. 16-19 depict embodiment views of the system content vault view 120, and FIG. 20 depicts an embodiment view of the Wake feed view 122.

Figure 12:
FIG. 12 is an illustration of a user content vault view according to an exemplary and non-limiting embodiment.

Referring to FIG. 12, the application may be designed to fit on one screen with no scrolling or scrolling within the page, such as to provide a tablet look and feel even on a standard computer. 1201 shows a visual link in the graphical user interface for the user's content/page vault that contains all the links that the user has submitted, whether as a link (stand alone and non-Wake related) or as part of the creation of a public or private Wake. 1202, shows the title and description of the link 1201; and on mouse over the user is provided with further information about the link including but not limited to; binds, likes, comments, name of the user who submitted the link, when the link was submitted, and the like.

Figure 13:
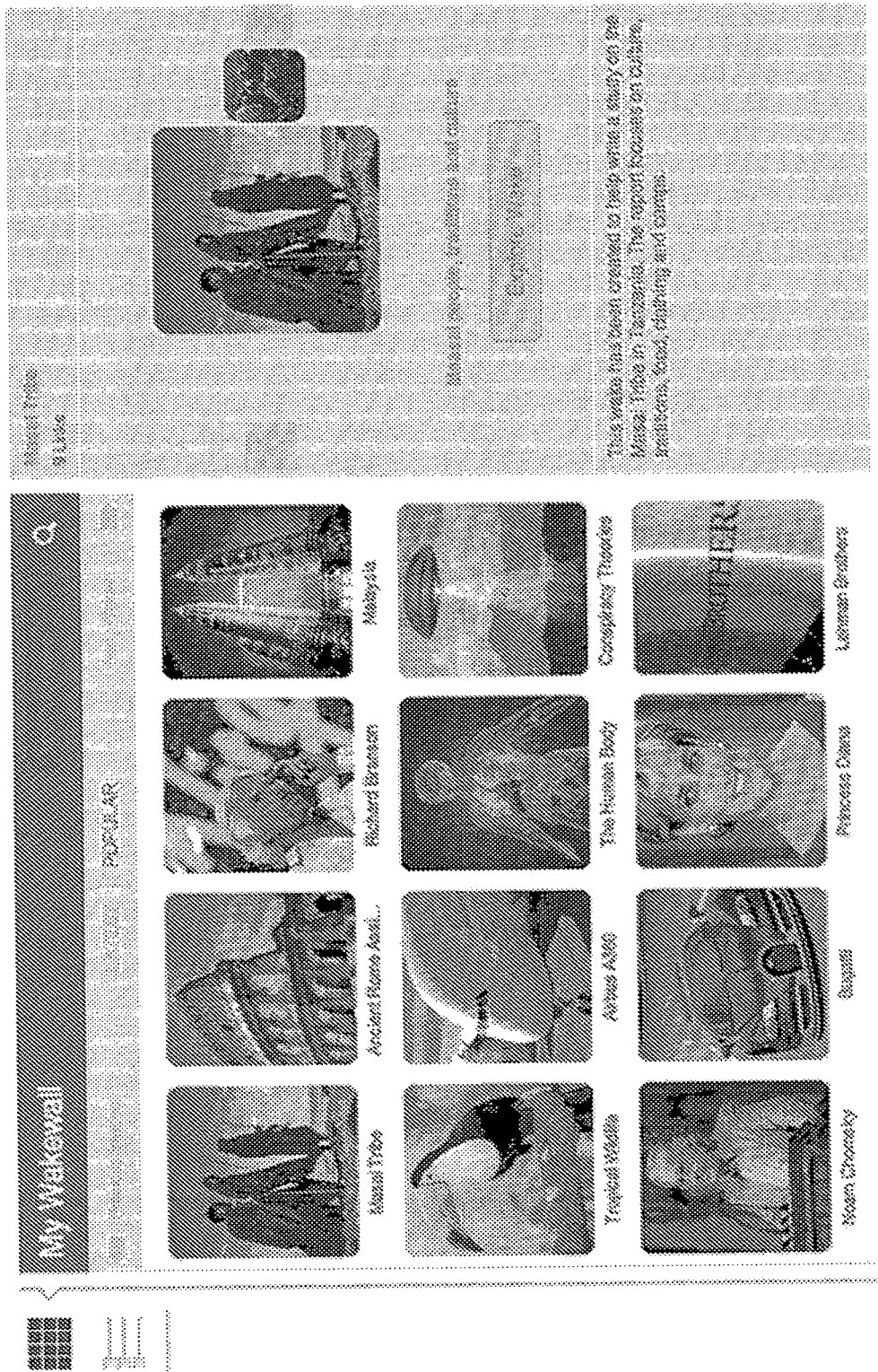
FIG. 13 is an illustration of a graphical user interface according to an exemplary and non-limiting embodiment.

Referring to FIG. 13, 1301 shows a graphical user interface for the user's content vault that contains all of the user's Wakes; 1302 is a carousel that enables the user to quickly browse through the links of a selected Wake; and 1303 is a Wake description provided by the user.

Figure 14:
FIG. 14 is an illustration of a graphical user interface of a Wake according to an exemplary and non-limiting embodiment.

Referring to FIG. 14, 1401 shows a graphical display of a Wake and its associated links. It may provide information about the Wake including but not limited to Wake creator, Wake title, number of links, and the like within the Wake and number of followers. Users may add new links directly into the Wake 'Add a page'. 1402 shows a link that has been selected from the Wake; this area displays; user's actions (read, share, comment) and activity/actions on the Wakes (likes, binds, comments). 1403 is where the related links may be provided to the user.

Figure 15:
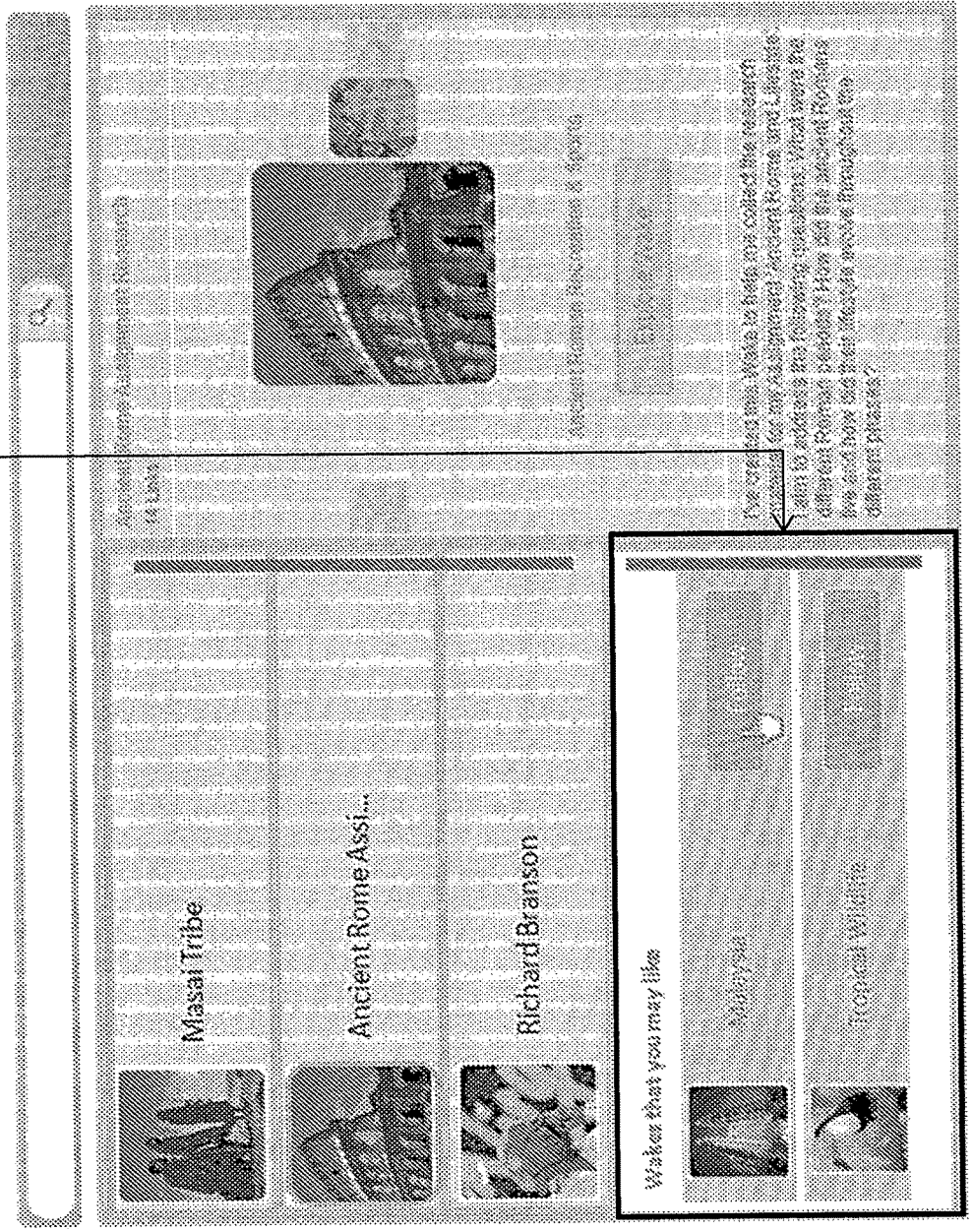
FIG. 15 is an illustration of a Wake according to an exemplary and non-limiting embodiment.

Referring to FIG. 15, 1501 shows the Wakes that the user is following. 1502 shows some Wakes that are recommended to the user 'Wakes that you may like'.

Figure 16:
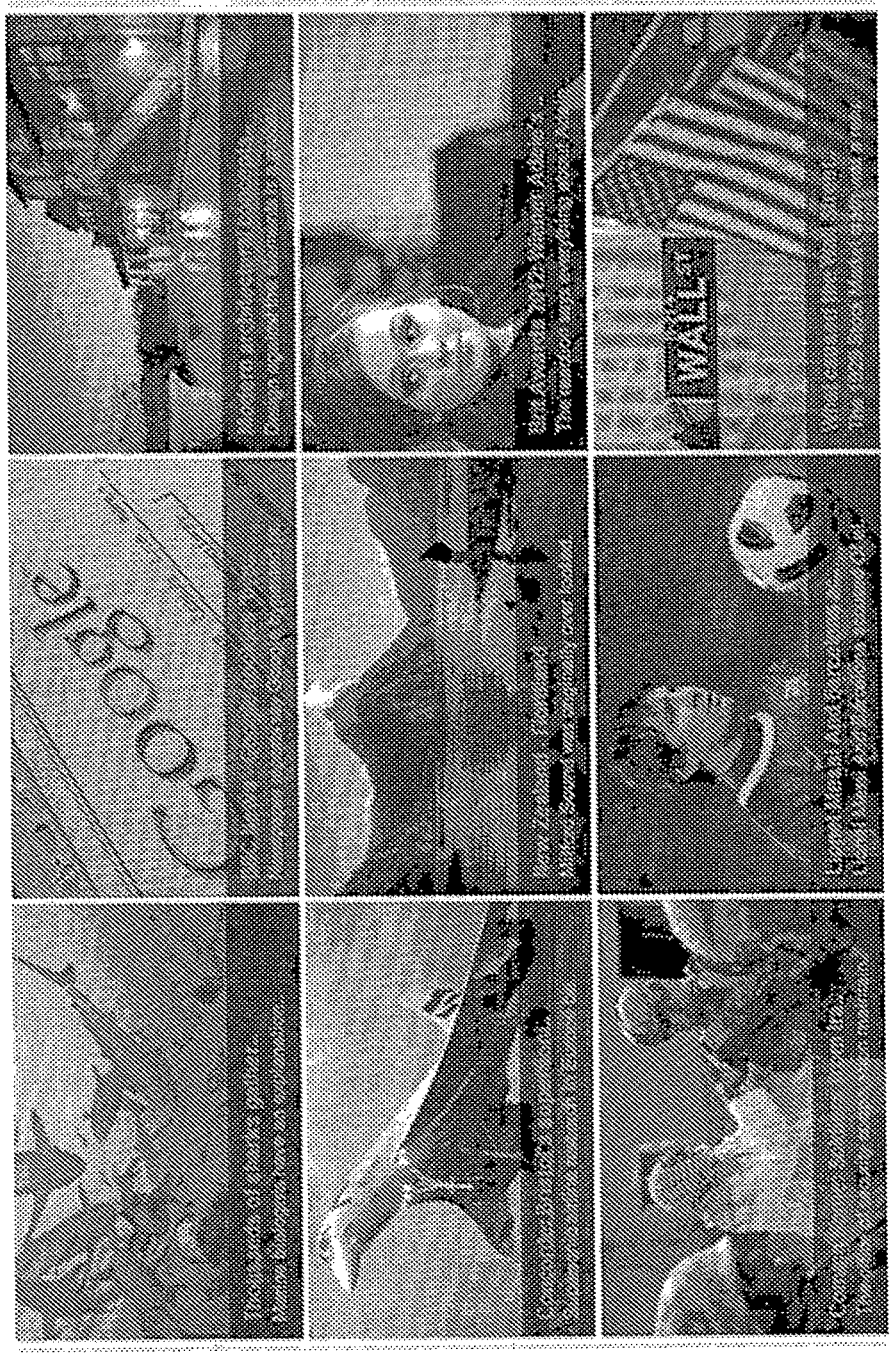
FIG. 16 is an illustration of a graphical user interface according to an exemplary and non-limiting embodiment.

Referring to FIG. 16, 1601 shows a graphical user interface for systems content vault. This contains links that have been submitted by all users whether as a link (stand alone and non-Wake related) or as part of the creation of a public Wake.

Figure 17:
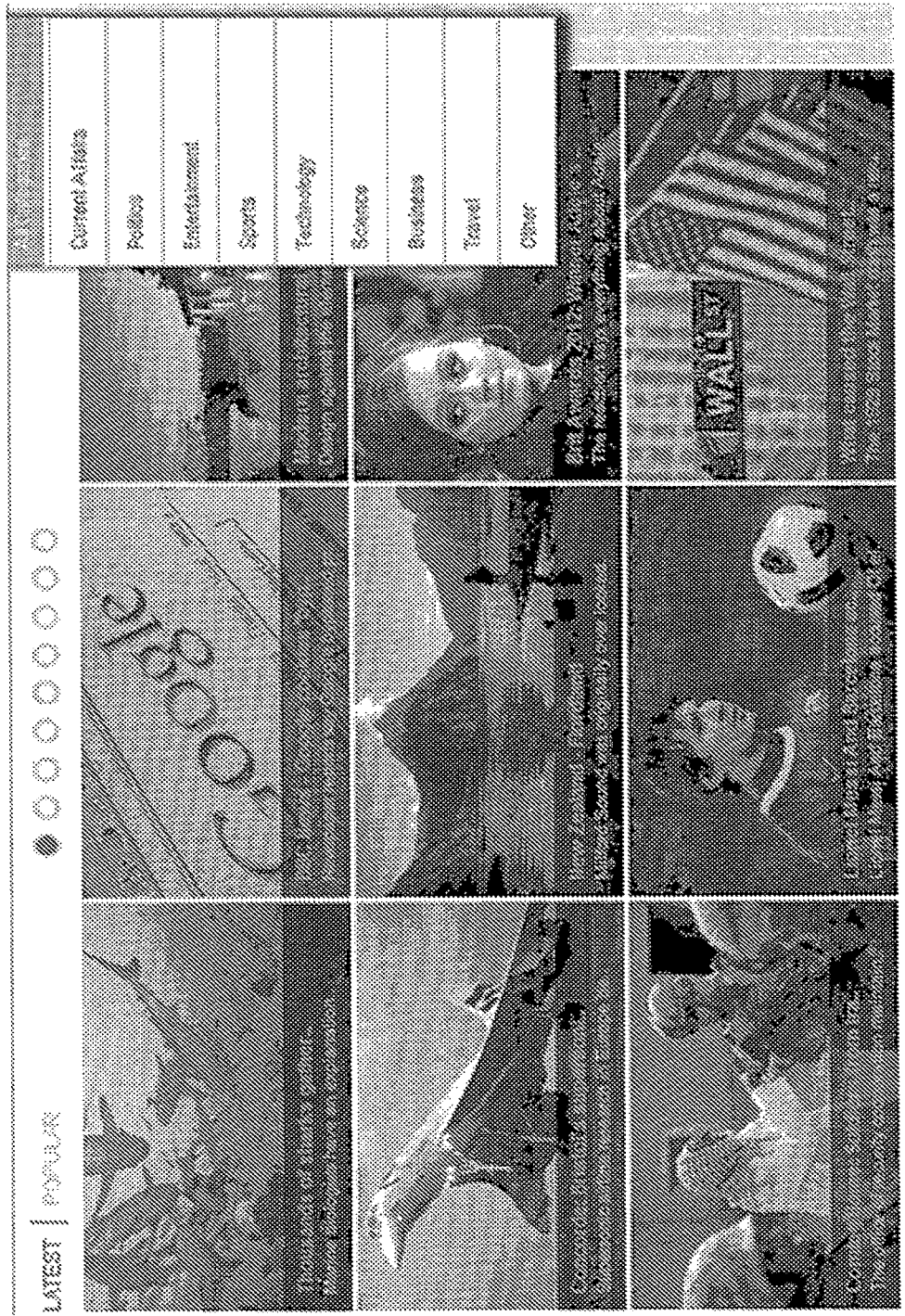
FIG. 17 is an illustration of a system content vault view according to an exemplary and non-limiting embodiment.

Referring to FIG. 17, 1701 shows the categories that the links are classified into by the user and the filters e.g. popular/latest that the user can use to organize the content.

Figure 18:
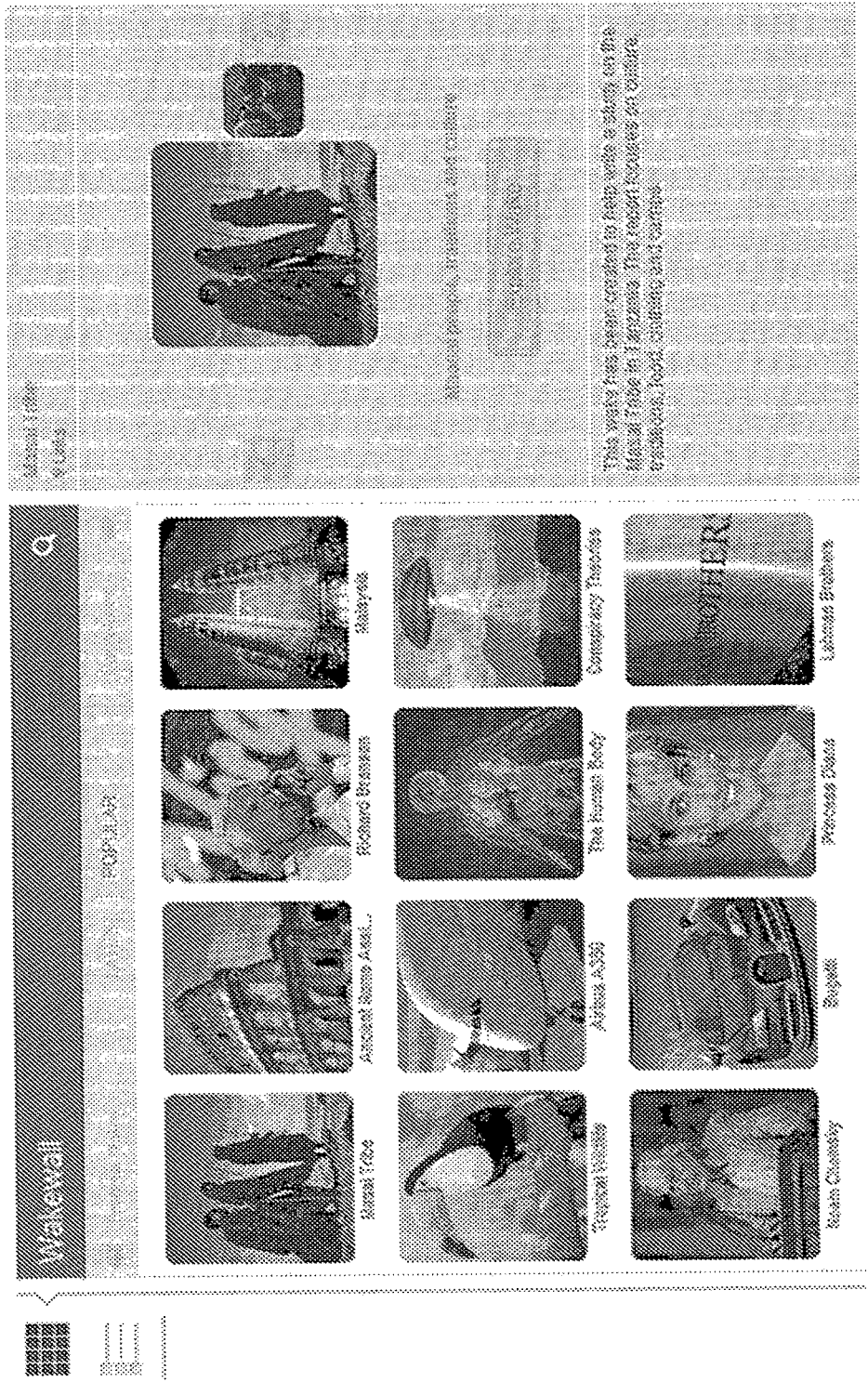
FIG. 18 is an illustration of a Wake content vault according to an exemplary and non-limiting embodiment.

FIG. 18 shows the systems Wake content vault. This is the public Wakes created by application users.

Figure 19:
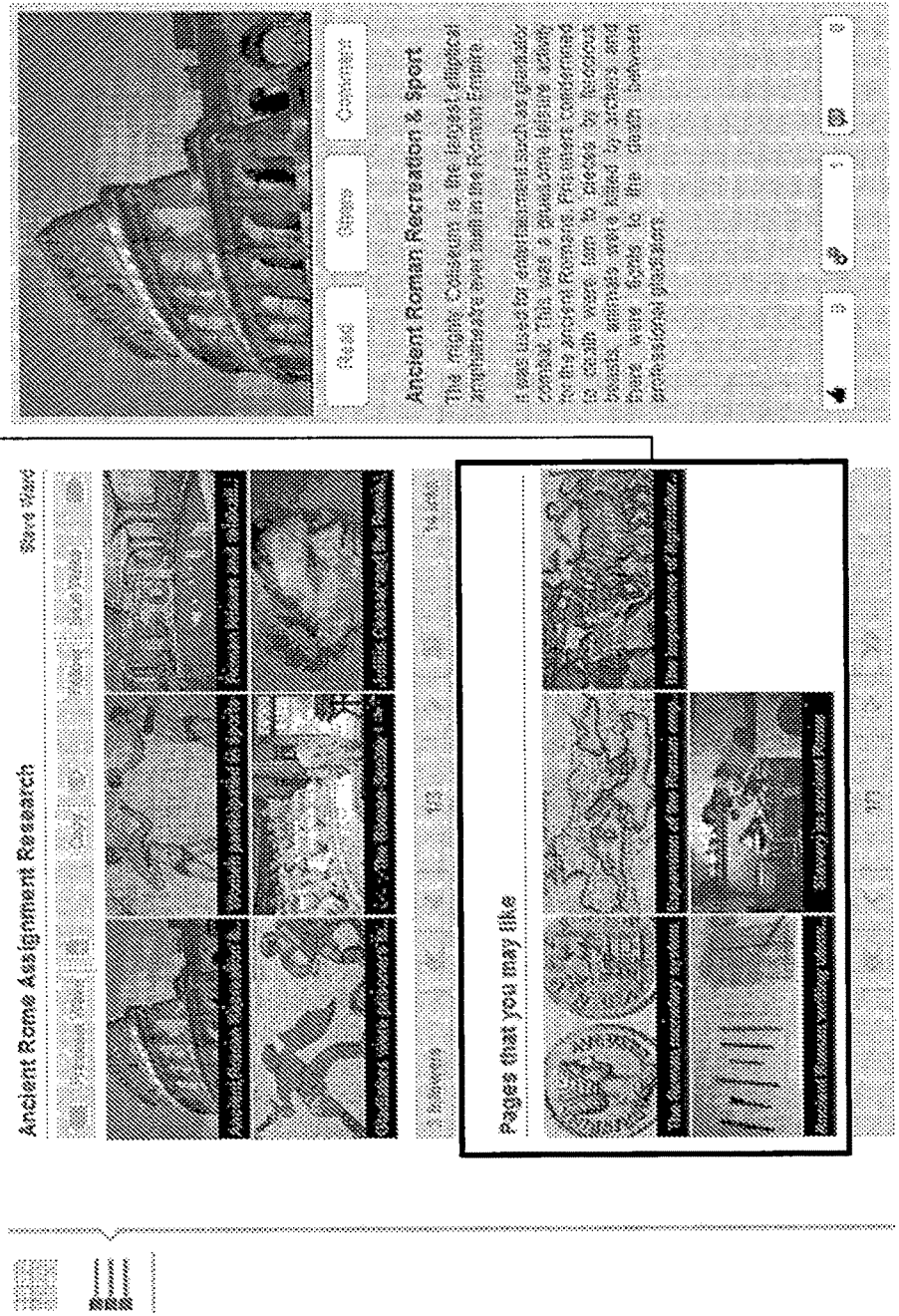
FIG. 19 is an illustration of a graphical Wake content vault according to an exemplary and non-limiting embodiment.
Figure 20:
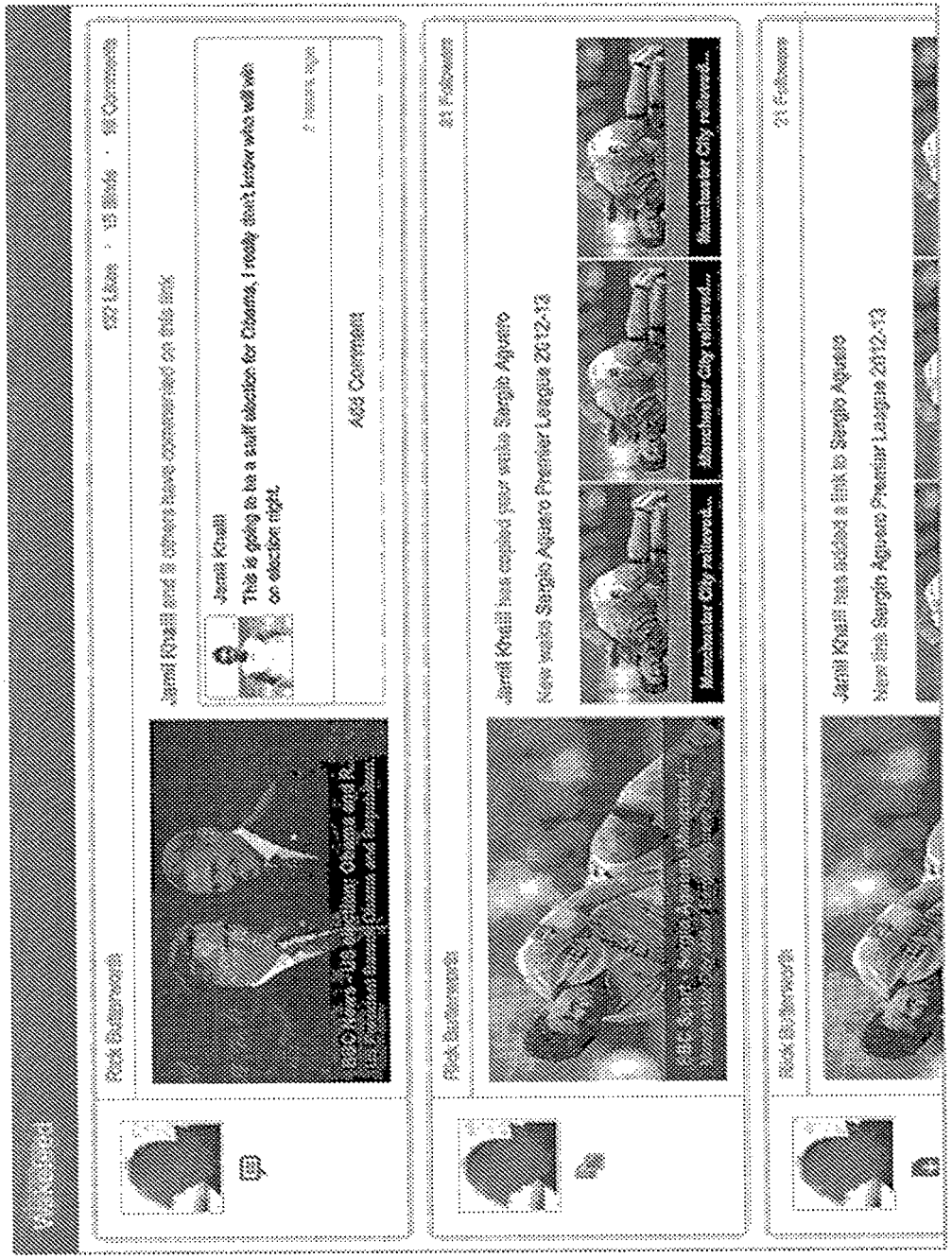
FIG. 20 is an illustration of a Wake feed view content vault according to an exemplary and non-limiting embodiment.

FIG. 19 shows the systems content vault view 'public Wakes/Wakes'. 1901 shows the user actions (copy, follow) of the public/system Wake.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A non-transitory computer readable medium containing program instructions wherein execution of the program instructions by one or more processors of a computer system causes the one or more processors to carry out the steps of:
receiving from a first user a first aggregation of web-linked content elements each web-linked content element comprising a URL and an image selection;
generating a profile of the first aggregation of web-linked content elements;
analyzing the first aggregation of web-linked content elements to identify a second aggregation of web-linked content elements of a second user based, at least in part, on a relation and a time of the relation, wherein the relation is based at least in part on a ratio of a number of URLs common to a number of URLs uncommon between the first aggregation and the second aggregation of web-linked content elements and wherein the relation is further based on a depth between the first aggregation and the second aggregation;
determining the depth between the first aggregation and the second aggregation,
wherein a first depth when the first aggregation and the second aggregation have at least one link in common, and
wherein a second depth when the first aggregation and the second aggregation do not have at least one link in common and the first aggregation has at least one common link with a third aggregation that has a common link with the second aggregation; and
providing, in response to identifying the relation, the second aggregation to the first user.

2. The computer readable medium of claim 1 wherein analyzing the first aggregation of web-linked content elements further comprises analyzing the first aggregation of web-linked content elements to identify another aggregation of web-linked content elements based, at least in part, on a category of the aggregation of web-linked content elements.

3. The computer readable medium of claim 2 wherein the category forms a part of the generated profile.

4. The computer readable medium of claim 1, further comprising the program instructions to carry out the step of:
tracking a current state and a chronological record of changes to the first and second aggregations.

5. The computer readable medium of claim 4, wherein the chronological record of changes provides a related context of the first and second aggregations.

6. The computer readable medium of claim 1, wherein the first aggregation is stored in a first database and the second aggregation is stored in a second database.

7. The computer readable medium of claim 1, wherein the first aggregation is curated by a group of users.

8. A computing system being arranged to enable a plurality of content aggregations the system comprising:
a content aggregation facility executing on a processor adapted to store and manage a first content aggregation wherein the first content aggregation is generated by a first user and is comprised of a plurality of web-linked content elements selected by the first user each web-linked content element comprising a URL and an image selection;
a wake feed engine executing on the processor adapted to transmit a first communication to the first user when a second user copies the first content aggregation to create a second content aggregation, to transmit a second communication to one or more users having an interest in the first content aggregation the second communication indicating existence of the second content aggregation, and to transmit a third communication to one or more users having an interest in at least one of the first and second content aggregations wherein the third communication indicates changes made to at least one of the first and second content aggregations; and
a plurality of user content databases, with at least one content database associated with each user, wherein the plurality of user content databases store content information associated with the web-linked content elements of the content aggregations generated by each user;
wherein the wake feed engine analyzes the first content aggregation of web-linked content elements to identify a second content aggregation of web-linked content elements of a second user based, at least in part, on a relation and a time of the relation, wherein the relation is based at least in part on ratio of a number of URLs common to a number of URLs uncommon between the first content aggregation and the second content aggregation of web-linked content elements and the relation is further based on a depth between the first content aggregation and the second content aggregation;
wherein a first depth between the first content aggregation and the second content aggregation is
when the first content aggregation and the second content aggregation have at least one link in common, and where a first depth is when the first content aggregation and the second content aggregation do not have at least one link in common and the first content aggregation has at least one common link with a third content aggregation that has a common link with the second content aggregation; and
wherein the wake feed engine in response to identifying the relation, provides the second content aggregation to the first user.

9. The computing system of claim 8 wherein the content information comprises a URL and an image selection.

10. The computing system of claim 8 wherein the content information comprises both content aggregations, that comprise a URL and an image selection, and at least one URL that is not associated with a content aggregation.

11. The computing system of claim 8 further comprising a content aggregation grader for applying attributes to stored content information to determine the interest, wherein the attributes are comprised of at least one of an aggregation activity factor derived from change information associated with a content aggregation, an aggregation relation factor value derived from a relationship determination between at least two content aggregations, and aggregation interest factor value indicative of a user interest stored in a user profile.

\* \* \* \* \*